(No Model.) 2 Sheets—Sheet 1.
E. E. RIES.
ELECTRIC METAL WORKING APPARATUS.

No. 564,453. Patented July 21, 1896.

(No Model.) 2 Sheets—Sheet 2.

E. E. RIES.
ELECTRIC METAL WORKING APPARATUS.

No. 564,453. Patented July 21, 1896.

Witnesses:
J. B. McGirr.
F. T. Chapman.

Inventor.
Elias E. Ries,
By Joseph Lyons,
Attorney.

UNITED STATES PATENT OFFICE.

ELIAS E. RIES, OF BALTIMORE, MARYLAND, ASSIGNOR TO RIES & HENDERSON, OF SAME PLACE.

ELECTRIC METAL-WORKING APPARATUS.

SPECIFICATION forming part of Letters Patent No. 564,453, dated July 21, 1896.

Original application filed November 9, 1889, Serial No. 329,765. Divided and this application filed May 1, 1891. Serial No. 391,190. (No model.)

*To all whom it may concern:*

Be it known that I, ELIAS E. RIES, a citizen of the United States, and a resident of Baltimore, Maryland, have invented certain new and useful Improvements in Electric Metal-Working Apparatus, of which the following is a specification.

This invention has reference to improvements in machines for repairing metal structures by the aid of electricity in the manner substantially as indicated in my application, Serial No. 301,915, filed March 5, 1889, and also described in Letters Patent No. 453,164, granted May 26, 1891, of which latter this is a division.

In my aforesaid application of March 5, 1889, I describe and claim generically a process of metal-working under which metallic articles can be expanded, compressed, separated, or otherwise operated upon by subjecting the article to the heating action of a current of electricity and then applying a suitable force for expanding, compressing, separating, or otherwise acting upon the metallic article.

In the patent of May 26, 1891, I describe a specific application of the general process, comprising the removal of defective portions of a metal structure and the insertion of new portions in their places by electric welding, as practiced preferably in accordance with the method set forth in my Patent No. 370,282, granted to me on September 20, 1887.

In the practical application of either of these processes it is necessary to use certain organized apparatus both for cutting the metal structure operated upon and for welding the separated ends of the structure, either to each other or to the newly-inserted pieces; and my present invention has reference to apparatus of this kind organized to have the cutting devices mounted upon or carried by the welding apparatus in such relation to the work that my processes above referred to may be practiced with speed and convenience.

In the accompanying drawings, which form a part of this specification, my improved apparatus is shown constructed in a form which adapts the same more especially for repairing lines of pipe or similar metal structures; but it will be understood that the same apparatus is equally adapted for the repair of railway-rails, conductor-lines, and other continuous metallic structures.

Figure 1:
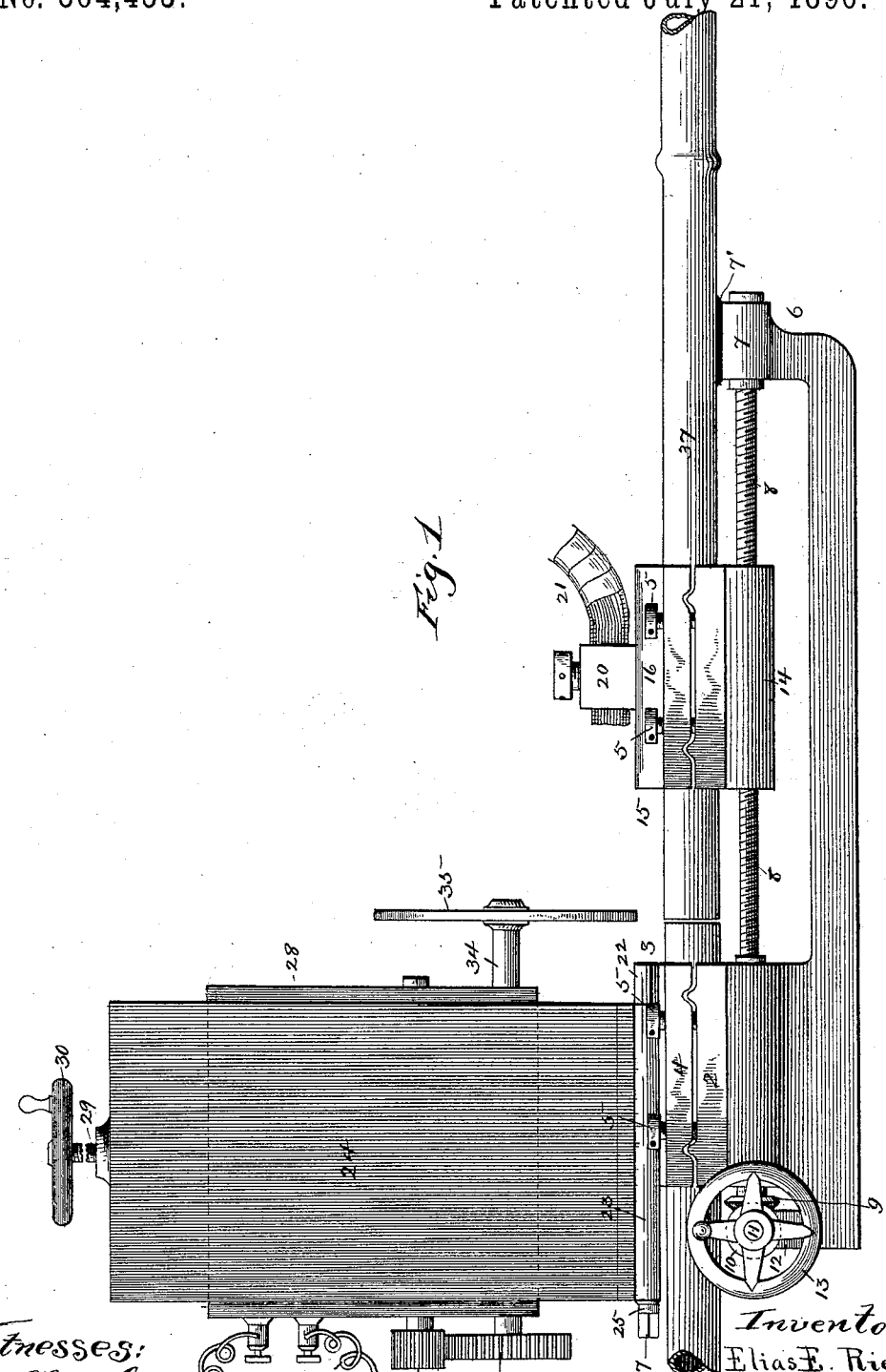
Figure 2:
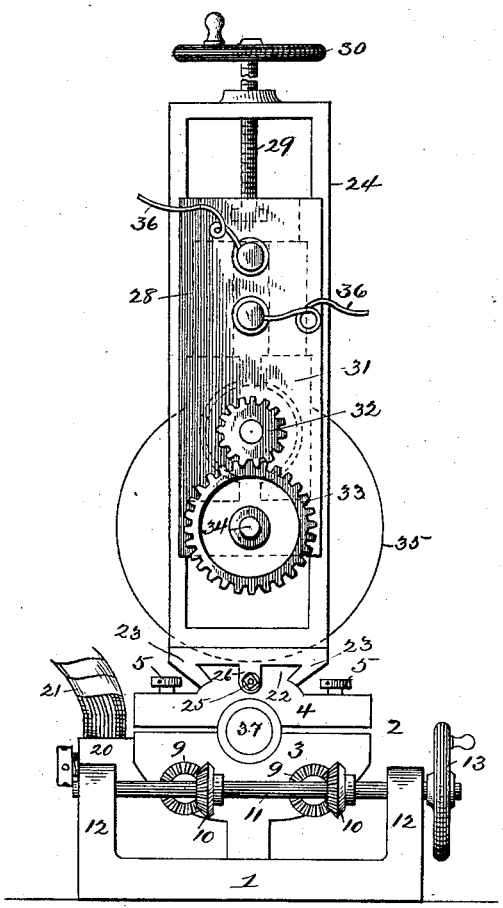
Figure 3:
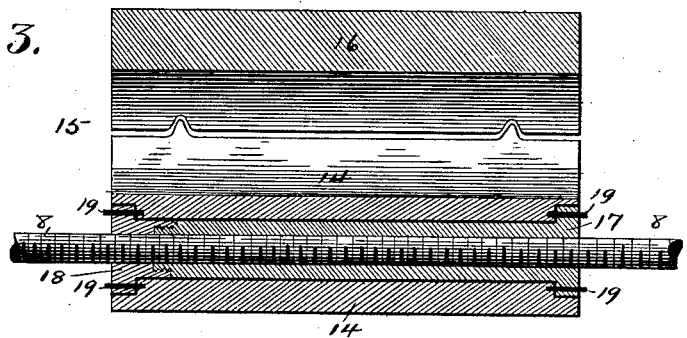

Figure 1 is a side elevation of a compound portable cutting and welding machine embodying my invention. Fig. 2 is an end elevation of the machine, and Fig. 3 is a detail sectional view of the movable clamp shown in Fig. 1.

Like numerals of reference indicate like parts throughout the drawings.

The several parts of the apparatus are sustained upon a casting 1, which at one end is formed into a jaw 2 of a clamp 3, the other jaw of which is marked by the reference-numeral 4. This upper jaw is applied to the lower by means of screws 5 or in any other suitable manner, so that the object placed between the two jaws will be securely clamped. The other end of the casting 1 is upturned, as indicated at 6, and is there formed into swivel-bearings 7 for the ends of screw-rods 8 8, which extend from one end of the casting to the other, and have also swivel-bearings in the casting immediately below the lower jaw 2 of the fixed clamp 3. At the free end each screw-rod carries a miter-gear 9, meshing with a similar gear 10, fixed to the counter-shaft 11, journaled in brackets 12, formed at the end of the casting next to the jaw 2 of the fixed clamp 3. This counter-shaft carries a crank or hand wheel 13, by which it may be rotated, and in thus rotating it it gives rotation to the screw-rods 8. On the two screw-rods is mounted the lower jaw 14 of a movable clamp 15, the upper jaw 16 of which is applied by means of screws 5 5, similar in this respect to the fixed clamp 3. For each screw-rod 8 there is provided in the lower jaw of the movable clamp a nut-bearing 17, which is composed of two parts fitted together, as indicated at 18 in Fig. 3, both insulated from the casting, as indicated in dark lines, and keyed to the same by pins 19 or in any other suitable manner. It will now be seen that when the hand-wheel is rotated the movable jaw will be fed to the right or to the left on the screw-rods 8 8, according to the direction of rotation. I can thus adjust the distance of the movable clamp from the fixed clamp.

The construction so far described is an effective means for clamping an object to be heated electrically between the two clamps and for adjusting the movable clamp with reference to the stationary clamp with ease and comfort; but I am by no means limited to this identical construction, since for the purposes of my invention any other form of clamp and adjusting devices for the same may be employed.

Each of the two clamps is provided with a binding-post 20, through which the heating-current is carried to the clamps and to the object held by the same by conductors 21, which, it will be understood, are connected with the source of heating-current. (Not shown in the drawings.) One of these binding-posts is shown in the drawings secured to the lower jaw of the stationary clamp, Fig. 2, and the other binding-post is shown as connected with the upper jaw of the movable clamp, Fig. 1, but these binding-posts may be differently placed, so long as provision is made for passing current through the object held by the clamps between the same and so long as provision is made against a short circuit around the clamps, which in the construction shown is done by the insulation interposed between the nut-bearing 17 and the body of the lower jaw of the movable clamp and by the insulation 7' on the bearing 7.

The upper jaw 4 of the stationary clamp has formed upon its upper face a dovetail guide 22, and into this guide is fitted a slide 23, formed with an undercut groove. This slide 23 is either secured to or formed in one piece with a rectangular frame 24, so that the whole frame can move longitudinally upon the upper jaw of the stationary clamp. This movement is effected by a feed-screw 25, having a smooth bearing in a lug 26, formed on the under side of the slide 23, and a nut-bearing in one end of the clamp-jaw 4. The projecting end 27 of the feed-screw is squared for the application of a crank or hand wheel.

A carriage 28 is mounted in the frame 24, so as to be movable vertically therein, and this movement is effected by a screw 29, swiveled to the carriage and having a nut-bearing in the upper end of the frame 24, a hand or crank wheel 30 being used for operating the screw. Thus it is possible to raise and lower the carriage within the frame. On this carriage 28 is mounted an electric motor 31, (indicated in dotted lines in Fig. 2,) and to the armature-shaft of this motor is secured a pinion 32, meshing with a gear 33, fixed to one end of a shaft 34, the other end of which carries a rotary cutting-tool 35, which may be either a fusion disk or a circular saw.

Current is admitted to the motor by flexible conductors 36 36, which current may be taken from the same source which supplies the heating-current for the object held between the clamps, or a separate source of current may be used.

For the purposes of my invention I need not necessarily use an electric motor, since any other form of effective motor, whether it be actuated by steam, air, gas, or water, and whether there be or not a reducing-gear, as herein shown, may be used. An electric motor, however, has special advantages, on account of ease of manipulation and its comparatively small weight.

It will now be seen that by operating the screw 29 the carriage 28 may be lowered until the rotary cutter 35 bears upon, cuts into, and eventually through the object held by the clamps. By operating the screw 25, the cutting-tool can be adjusted to the desired position, and by operating the screw-rods 8 8 the length of the portion of the pipe or rod to be heated is determined. The operation of this apparatus for the practice of the methods described in my aforesaid application and patent will now be clear.

Suppose it be desired to cut a pipe into two pieces. It is then only necessary to clamp it on one side of the line of the proposed cut in the stationary clamp, then adjust the movable clamp by properly operating the hand-wheel 13, then clamp the pipe (marked in the drawings by the numeral 37) in the movable clamp, then pass a heating-current between the two clamps and through the portion of the pipe extending between the same, then adjust the cutter 35 by the screw 25 to the required position, and finally feed the carriage downward until the cut is effected, it being understood that current has been applied to the electric motor. If in this manner a defective section of a metal structure has been cut out, the cut ends may be welded together, or a new section may be welded in between the cut ends by the same machine. It is then only necessary to raise the cutting-tool, bring the ends to be welded into contact by actuating the hand-wheel 13, pass a welding-current between the clamps, and simultaneously therewith force these ends together by operating the same hand-wheel until the weld is effected. The clamps therefore serve the purpose both of electrically heating a section of a metal structure preparatory to and during the operation of cutting it and also of welding two pieces together electrically.

Having now fully described my invention, I claim and desire to secure by Letters Patent—

1. An electric metal-working apparatus comprising clamps for holding the metal to be operated upon and constituting the terminals of an electric heating-circuit, and an electrically-operated cutting-tool mounted adjustably with reference to the work and adjustable between the clamps, substantially as described.

2. In an electric metal-working apparatus, the combination of clamps for holding the metal to be operated upon, and constituting the terminals of an electric heating-circuit; with a frame adjustably mounted upon one of said clamps and an electrically-operated cutting-tool adjustably mounted in said frame, substantially as described.

3. In a metal-working apparatus, the combination of clamps constituting the terminals of an electric heating-circuit; with ways or guides extending parallel upon one of said clamps, and a cutting apparatus mounted on said ways or guides, substantially as described.

4. In a metal-working apparatus, the combination of clamps constituting the terminals of an electric heating-circuit; with a cutting-tool mounted upon one of said clamps for operation in a plane between the clamps and adjustable longitudinally between the same, substantially as described.

5. An electric metal-working apparatus, comprising two clamps for holding a section of a metal structure and passing an electric heating-current through the same, and a cutting apparatus mounted upon one of these clamps in operative relation to the portion of the structure which extends between the clamps, substantially as described.

6. In an electric metal-working apparatus, the combination of a fixed and a movable clamp for holding a section of a metal structure and for passing an electric heating-current through the same; with a cutting apparatus mounted upon the fixed clamp in operative relation to the portion of the structure extending between the two clamps, substantially as described.

7. In an electric metal-working apparatus, the combination of two clamps for holding a section of a metal structure between them, and for passing an electric heating-current through the same; with a cutting apparatus adjustably mounted upon one of the clamps in operative relation to the structure operated upon, substantially as described.

8. In a combined electric heating, welding and cutting apparatus, the combination of one fixed and one movable clamp, insulated from each other, and each constituting the terminal of a source of electric heating or welding current; with an electrically-operated rotary cutter mounted upon the fixed clamp, adjustable longitudinally between the clamps, and transversely to the line between the same, substantially as described.

In testimony whereof I have signed my name to this specification in the presence of two subscribing witnesses.

ELIAS E. RIES.

Witnesses:
HENRY E. COOPER,
F. T. CHAPMAN.